(12) United States Patent
Song et al.

(10) Patent No.: US 10,533,805 B2
(45) Date of Patent: Jan. 14, 2020

(54) OUTDOOR HEAT EXCHANGER

(71) Applicant: Hanon Systems, Daejeon (KR)

(72) Inventors: Jun Young Song, Daejeon (KR); Dong Suk Lee, Daejeon (KR); Sun Mi Lee, Daejeon (KR); Hong-Young Lim, Daejeon (KR); Wi Sam Jo, Daejeon (KR)

(73) Assignee: Hanon Systems, Daejeon (KR)

( * ) Notice: Subject to any disclaimer, the term of this patent is extended or adjusted under 35 U.S.C. 154(b) by 24 days.

(21) Appl. No.: 15/542,022

(22) PCT Filed: Apr. 21, 2016

(86) PCT No.: PCT/KR2016/004147
§ 371 (c)(1),
(2) Date: Jul. 6, 2017

(87) PCT Pub. No.: WO2017/003075
PCT Pub. Date: Jan. 5, 2017

(65) Prior Publication Data
US 2018/0274864 A1  Sep. 27, 2018

(30) Foreign Application Priority Data

Jun. 30, 2015 (KR) .................. 10-2015-0092893

(51) Int. Cl.
*F28F 9/02* (2006.01)
*F28D 7/00* (2006.01)
*F28F 1/12* (2006.01)

(52) U.S. Cl.
CPC .............. *F28D 7/0066* (2013.01); *F28F 1/12* (2013.01); *F28F 9/0229* (2013.01); *F25B 2313/027* (2013.01)

(58) Field of Classification Search
CPC ........................... F25B 39/00; F25B 2313/027

USPC .................................................. 165/137, 300
See application file for complete search history.

(56) References Cited

U.S. PATENT DOCUMENTS 5,065,586 A * 11/1991 Shapiro-Baruch ........ F24F 3/14
                                                           62/324.1
5,546,981 A *  8/1996 Li ......................... F16K 15/028
                                                           137/493.3
5,826,649 A * 10/1998 Chapp et al. ........... F25B 39/00
                                                           165/174

(Continued)

FOREIGN PATENT DOCUMENTS

DE    102008051892 A1   5/2009
JP       2005343221    12/2005

(Continued)

OTHER PUBLICATIONS

International Search Report dated Aug. 16, 2016 in PCT/KR2016/004147.

*Primary Examiner* — Allen J Flanigan
(74) *Attorney, Agent, or Firm* — Norton Rose Fulbright US LLP

(57) ABSTRACT

The present invention relates to an outdoor heat exchanger, and more particularly, to an outdoor heat exchanger including a variable baffle whose opening and closing are controlled according to a switching of cooling/heating modes of a vehicle heat pump system to easily change a refrigerant pass and reduce the number of refrigerant passes at the time of heating than at the time of cooling.

23 Claims, 14 Drawing Sheets

(56) References Cited

U.S. PATENT DOCUMENTS

| 8,235,101 B2* | 8/2012 | Taras | F25B 13/00 |
| | | | 165/101 |
| 2008/0023182 A1* | 1/2008 | Beamer | F28D 1/05391 |
| | | | 165/137 |
| 2011/0036113 A1* | 2/2011 | Kopko | F25B 29/003 |
| | | | 62/324.5 |

FOREIGN PATENT DOCUMENTS

| KR | 20030072493 | 9/2003 |
| KR | 100842209 | 6/2008 |
| KR | 20090046457 | 5/2009 |
| KR | 20140077035 | 6/2014 |
| KR | 20140083320 | 7/2014 |

* cited by examiner

OUTDOOR HEAT EXCHANGER

This application is a 371 of International Application No. PCT/KR2016/004147 filed Apr. 21, 2016, which claims priority from Korean Patent Application No. 10-2015-0092893 filed Jun. 30, 2015, and Korean Patent Application No. 10-2015-0099577, filed Jul. 14, 2015, each of which is incorporated herein by reference in its entirety for all purposes.

TECHNICAL FIELD

The present invention relates to an outdoor heat exchanger, and more particularly, to an outdoor heat exchanger including a variable baffle whose opening and closing are controlled according to a switching of cooling and heating modes of a vehicle heat pump system to easily change a refrigerant pass and reduce the number of refrigerant passes at the time of heating than at the time of cooling.

BACKGROUND ART

Vehicles using an engine, which uses gasoline, diesel oil, and the like as an energy source, as a driving source are a general vehicle type. However, the vehicles increasingly require new energy sources due to various factors such as the environmental pollutions of the energy sources for vehicles and the reduction in oil deposits. At present, one of technologies which are the closest approach to commercialization drives vehicles using a fuel cell as an energy source.

However, unlike the existing vehicles having an engine using petroleum as an energy source, vehicles using the fuel cell may not use a heating system using cooling water. That is, the existing vehicles having the engine using petroleum as an energy source have considerable heat generated from the engine, include a cooling water circulation system for cooling the engine, and allow the cooling water to use heat absorbed from the engine for indoor heating. However, since driving sources used in the vehicles using the fuel cell do not generate heat as much as that generated from the engine, the electric vehicles have a limit of using the existing heating scheme.

Therefore, various researches for fuel cell vehicles having a heat pump added to an air conditioning system, using the heat pump as a heat source, and including a separate heat source such as an electric heater, or the like have been conducted.

As the related technology, Korean Patent Laid-Open Publication No. 10-2012-0103054 (Published on Sep. 19, 2012, Title: Heat Pump System For Vehicles) is disclosed. FIGS. 1 and 2 are configuration diagrams illustrating the existing vehicle heat pump system.

As illustrated in FIGS. 1 and 2, the vehicle heat pump system 10 mainly includes an outdoor heat exchanger 11, an indoor heat exchanger 12, an evaporator 13, a compressor 14, an expander 15, and a chiller 16.

First, a heating cycle will be described with reference to FIG. 1. The indoor heat exchanger emits high-temperature heat during the heat exchange of a high-temperature and high-pressure refrigerant and supplies the emitted heat to the interior of the vehicle, thereby heating the interior of the vehicle.

The refrigerant having passed through the indoor heat exchanger passes through a first valve 21 and then passes through the chiller 16 by a second three-way valve 23 without passing through the outdoor heat exchanger by a first three-way valve 22 to exchange heat with cooling water for electrical parts introduced from an electric radiator 24, such that the chiller serves as an evaporator. Thereafter, the refrigerant repeatedly passes through a circulation route to pass through the compressor and then the indoor heat exchanger.

Describing the cooling cycle with reference to FIG. 2, the outdoor heat exchanger operates as a condenser, and the condensed refrigerant passes through the evaporator by the second three-way valve and supplies cold air to the interior of the vehicle while absorbing the ambient heat. Next, the refrigerant repeatedly passes through the circulation route to pass through the compressor and the indoor heat exchanger and again pass through the outdoor heat exchanger by the first three-way valve, thereby forming a cooling cycle.

As described above, the outdoor heat exchanger serves as a condenser in the cooling mode and serves as the evaporator in a heating mode.

In this case, the outdoor heat exchanger is preferably designed in such a manner that the number of columns of a tube for each pass decreases in accordance with the flow of the refrigerant in the cooling mode and the number of passes decreases in order to reduce the amount of pressure drop on the refrigerant side in the heating mode.

FIG. 3 illustrates the outdoor heat exchanger in which an inlet and an outlet of the refrigerant are opposite to each other when the cooling and heating modes are switched and FIG. 4 illustrates the outdoor heat exchanger in which the inlet and the outlet of the refrigerant are not changed when the cooling and heating modes are switched.

First, FIG. 3 illustrates the outdoor heat exchanger that has a 3-pass refrigerant flow in the cooling mode and has a 1-pass refrigerant flow in the heating mode.

By the way, in order to enable the refrigerant flow, baffles provided on a first header tank and a second header tank need to be configured to be closed during cooling and opened during heating.

Next, the outdoor heat exchanger of FIG. 4 is a down flow type and is configured so that the refrigerant may pass through a receiver dryer and then pass through the last pass to secure a sub-cooling region required for cooling. In general, however, the securing of the sub-cooling region as described above is limited to the cooling mode, and there is no need to secure the sub-cooling region in the heating mode in which the outdoor heat exchanger operates as the evaporator.

As illustrated in FIG. 4, in the outdoor heat exchanger, the refrigerant passes through the receiver dryer in both of the cooling and heating modes, the amount of pressure drop on the refrigerant side increases as the refrigerant passes through the receiver dryer even during heating, such that a frosting phenomenon first occurs at the last pass (portion illustrated as a dotted region in FIG. 4). Therefore, there is a need to develop an outdoor heat exchanger of a vehicle heat pump that may retard the frosting as far as possible by preventing the refrigerant from flowing to the receiver dryer during heating.

Technical Problem

An object of the present invention is to provide an outdoor heat exchanger including a variable baffle whose opening and closing are controlled according to a switching of cooling and heating modes of a vehicle heat pump system to easily change a refrigerant pass and reduce the number of refrigerant passes at the time of heating than at the time of cooling.

Technical Solution

In one general aspect, an outdoor heat exchanger 1 of a vehicle heat pump system includes: a first header tank 100 and a second header tank 200 having a refrigerant introduced thereinto or discharged therefrom and disposed in parallel while being spaced apart from each other by a predetermined distance in a height direction or a longitudinal direction; a plurality of tubes 300 having both ends fixed to the first and second header tanks 100 and 200 to form a refrigerant channel; a plurality of fins 400 interposed between the tubes 300; and a variable baffle 700 disposed in the first header tank 100 or the second header tank 200 and having opening and closing controlled according to switching of cooling and heating modes.

The number of refrigerant flow passes in a cooling mode may be equal to or larger than the number of refrigerant flow passes in a heating mode.

A position of the inlet 101 into which the refrigerant is introduced and a position of the outlet 102 through which the refrigerant is discharged may be the same even if the outdoor heat exchanger 1 is switched to the cooling or heating mode.

The outdoor heat exchanger may further include: a switching baffle 600 disposed in the first header tank 100 or the second header tank 200 to control a flow of the refrigerant; and a receiver dryer 500 connected to the second header tank 200 through a first connection part 510 and a second connection part 520.

The variable baffle may include: a first variable baffle 701 disposed in the first header tank 100 or the second header tank 200 and opened and closed to induce or block the flow of the refrigerant; and a second variable baffle 702 disposed in the first connection part 510 or the second connection part 520 to be opened and closed.

The first variable baffle 701 and the second variable baffle 702 may have opening and closing controlled according to a change in refrigerant temperature according to the switching of the cooling or heating mode.

The first variable baffle 701 and the second variable baffle 702 may be made of a material whose shape or position is changed according to the change in temperature. The outdoor heat exchanger 1 may be a down flow type heat exchanger in which the first header tank 100 and the second header tank 200 are disposed in parallel while being spaced apart from each other by a predetermined distance in a height direction.

The first header tank 100 may include: an inlet tank 110 extending in a longitudinal direction to be introduced with the refrigerant; and an outlet tank 120 disposed on the inlet tank 110 in parallel with the inlet tank 110 in the height direction to discharge the refrigerant.

Two switching baffles 600 may be disposed within the inlet tank 110 of the first header tank 100 at a predetermined interval, the one switching baffle 600 may be disposed at a front end the second header tank 200 in a refrigerant flow direction, and the first variable baffle 701 may be disposed at a rear end, such that the outdoor heat exchanger 1 may have a 4-pass channel in the cooling and heating modes.

In the cooling mode, the first variable baffle 701 may be closed and the second variable baffle 702 may be opened and thus a 3-pass refrigerant may reach a 4 pass via the receiver dryer 500 and in the heating mode, the first variable baffle 701 may be opened and the second variable baffle 702 may be closed and thus the 3-pass refrigerant directly may reach 4 pass.

The first variable baffle 701 may be disposed at a front end in the refrigerant flow direction within the inlet tank 110 of the first header tank 100 and the switching baffle 600 may be disposed at a rear end while being spaced apart therefrom by a predetermined interval and the two first variable baffles 701 may be disposed within the second header tank 200 at a predetermined interval, such that the outdoor heat exchanger 1 may have a 4-pass channel in the cooling mode and a 2-pass channel in the heating mode.

In the cooling mode, the first variable baffle 701 may be closed and the second variable baffle 702 may be opened and thus a 3-pass refrigerant may reach a 4 pass via the receiver dryer 500 and in the heating mode, the first variable baffle 701 may be opened and the second variable baffle 702 may be closed and thus the 1-pass refrigerant directly may reach 2 pass.

At the time of the switching of the cooling and heating modes in the vehicle heat pump system, a position of the inlet 101 into which the refrigerant is introduced and a position of the outlet 102 through which the refrigerant is discharged may be changed to each other and the flow of the refrigerant may be reversed.

The variable baffle 700 may be opened in the cooling mode. The variable baffle 700 may be disposed in each of the first header tank 100 and the second header tank 200 one by one to have a 3-pass refrigerant flow in the cooling mode and a 1-pass refrigerant flow in the heating mode.

The variable baffle 700 may be disposed in each of the first header tank 100 and the second header tank 200 two by two to have a 5-pass refrigerant flow in the cooling mode and a 1-pass refrigerant flow in the heating mode.

The variable baffle 700 may include: a first fixing means 710 coupled with the first header tank 100 or the second header tank 200 and including a first refrigerant flow hole 711 formed by hollowing the certain region thereof; a second fixing means 720 coupled and fixed to a plurality of seating protrusions 721 by contacting a plurality of seating protrusions that protrude from an edge of one side of the first fixing means 710 while being spaced apart from each other by a predetermined interval in a circumferential direction and including a second refrigerant flow hole 722 through which the refrigerant flows; an opening and closing means 730 disposed in a space part 731 between the first fixing means 710 and the second fixing means 720 formed by the seating protrusion 721 and linearly moving within the space part 731 in the refrigerant flow direction; and a clad barrier wall 740 formed in a certain region of an outer side of the first refrigerant flow hole while protruding from the other side of the first fixing means 710.

In the variable baffle 700, one side of the first fixing means 710 may be further provided with the clad barrier wall 740 and the clad barrier wall 740 may be formed to be positioned at an outer side of the opening and closing means 730.

The clad barrier wall 740 may protrude in a region of an outer side of the first refrigerant flow hole located at one side or both sides in a width direction of the outdoor heat exchanger 1.

The clad barrier wall 740 may protrude over the whole region of the outer side of the first refrigerant flow hole 711.

The clad barrier wall 740 may protrudes at a predetermined interval over the whole region of the outer side of the first refrigerant flow hole 711.

The second refrigerant flow hole 722 may be formed in a certain region of the second fixing means 720 while being hollow and formed in at least one.

The second refrigerant flow hole 722 may be formed by digging a certain region of an outer circumferential surface of the second fixing means 720 inwardly and formed in at least one.

The variable baffle 700 may be coupled with the first header tank 100 or the first header tank 200 so that the second fixing means 720 of the variable baffle 700 is disposed on a front surface in the refrigerant flow direction in the cooling mode.

Advantageous Effects

According to the exemplary embodiment of the present invention, the outdoor heat exchanger includes the variable baffle whose the opening and closing are controlled according to the switching of the cooling and heating modes of the vehicle heat pump system, thereby easily changing the refrigerant pass and reducing the number of refrigerant passes at the time of heating than at the time of cooling. The outdoor heat exchanger according to the exemplary embodiment of the present invention configures the pass so that the refrigerant bypasses the receiver dryer only in the heating mode without changing the inlet and the outlet of the refrigerant even if the cooling and heating modes of the vehicle heat pump system are switched, thereby maximally retarding the frosting phenomenon and reducing the weight of the system.

For this purpose, the outdoor heat exchanger according to the exemplary embodiment of the present invention includes the first variable baffle and the second variable baffle whose opening and closing are controlled according to the change in the refrigerant temperature due to the switching of the cooling and heating modes, thereby controlling the channel to prevent the refrigerant from passing through the receiver dryer during heating as well as changing the number of columns of the tube for each pass.

That is, according to the exemplary embodiment of the present invention, the inlet/outlet of the refrigerant need not be changed at the time of the switching to the cooling or heating mode, and therefore the additional switching valve is not required, such that it is possible to reduce the weight of the system, save costs, and prevent the frosting phenomenon from being accelerated due to the increase in the amount of pressure drop on the refrigerant side occurring while passing through the receiver dryer in the heating mode.

In addition, according to the exemplary embodiment of the present invention, the first variable baffle and the second variable baffle whose the opening and the closing are controlled according to the temperature are made of the shape memory alloy or the bi-metal using heterogeneous metal having different coefficients of thermal expansion, or the like, such that the position and the shape of the first variable baffle and the second variable baffle may be changed as needed even during the operation of the system. According to another exemplary embodiment of the present invention, the positions of the inlet and the outlet may be configured to be opposite to each other in the cooling and heating modes. In this case, the variable baffle whose the opening and closing are controlled according to the differential pressure generated according to the flow of the refrigerant may be included, such that it is possible to reduce the number of refrigerant passes at the time of heating than at the time of cooling without the separate operation.

In this case, the outdoor heat exchanger may be manufactured by the simple assembling process of installing the variable baffle instead of the baffle previously used, such that there is no need to manufacture the additional parts.

In addition, the variable baffle according to the exemplary embodiment of the present invention is advantageous in that the opening/closing means that needs to freely move according to the refrigerant flow direction may be prevented from being welded by the clad pushed in the direction of gravity during the brazing, thereby ensuring the stable performance.

BEST MODE

Hereinafter, an outdoor heat exchanger 1 according to an exemplary embodiment of the present invention as described above will be described in detail with reference to the accompanying drawings.

The outdoor heat exchanger 1 according to the exemplary embodiment of the present invention is disposed in a vehicle heat pump system and serves as a condenser in a cooling mode and serves as an evaporator in a heating mode and may be formed in a down flow type or in a cross flow type.

At this point, in the outdoor heat exchanger according to the exemplary embodiment of the present invention, the number of flow passes of a refrigerant in the cooling mode is equal to or greater than the number of flow passes of a refrigerant in the heating mode to prevent a frosting phenomenon from being accelerated due to an increase in the amount of pressure drop on a refrigerant side.

Figure 19:
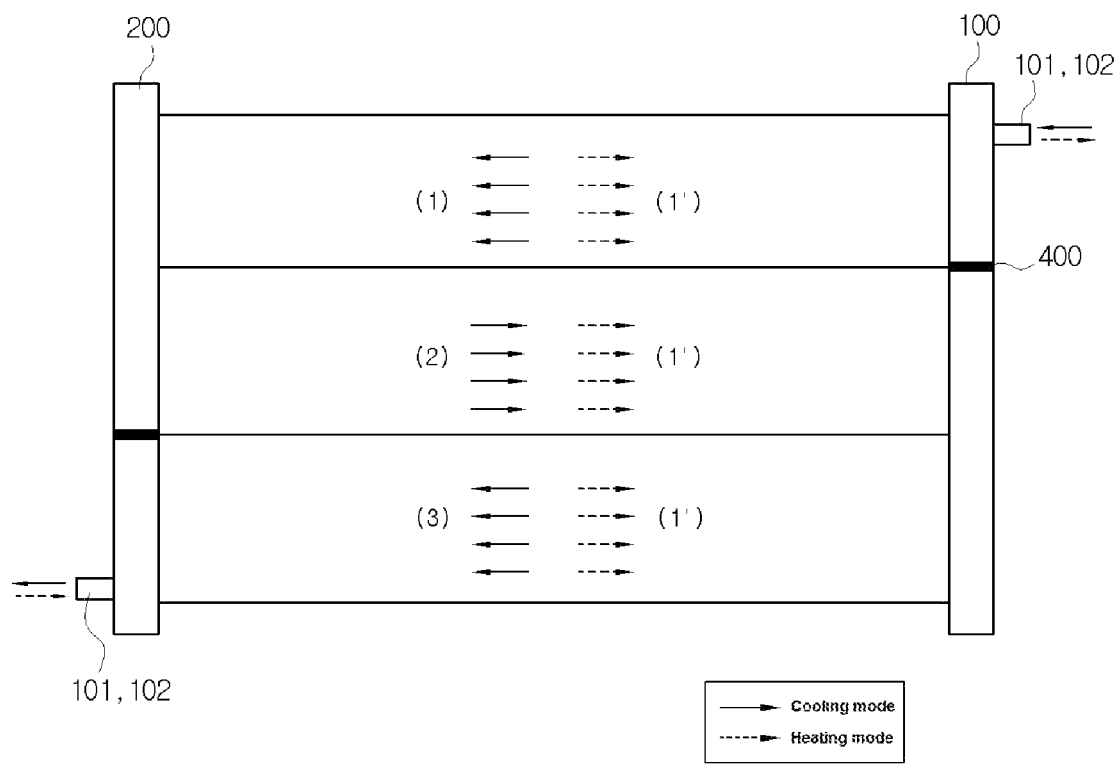
FIGS. 19 to 21 are views illustrating various examples of the flow of the refrigerant of the outdoor heat exchanger according to the exemplary embodiment of the present invention.
Figure 20:
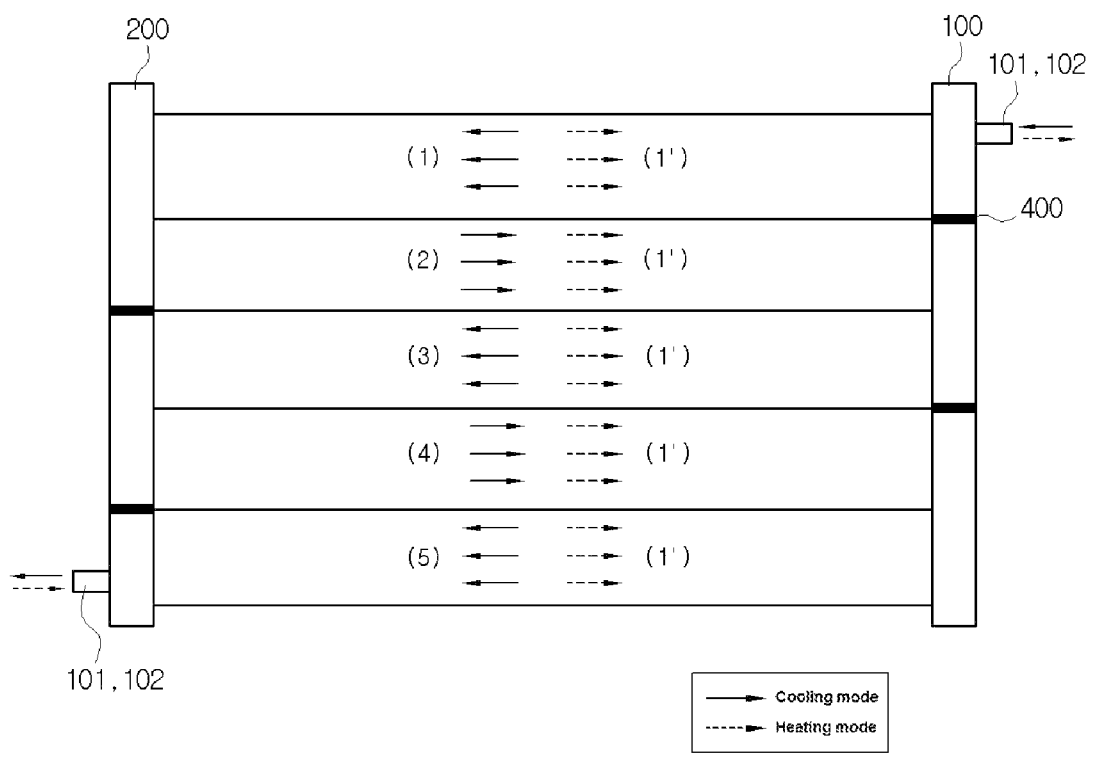
Figure 21:
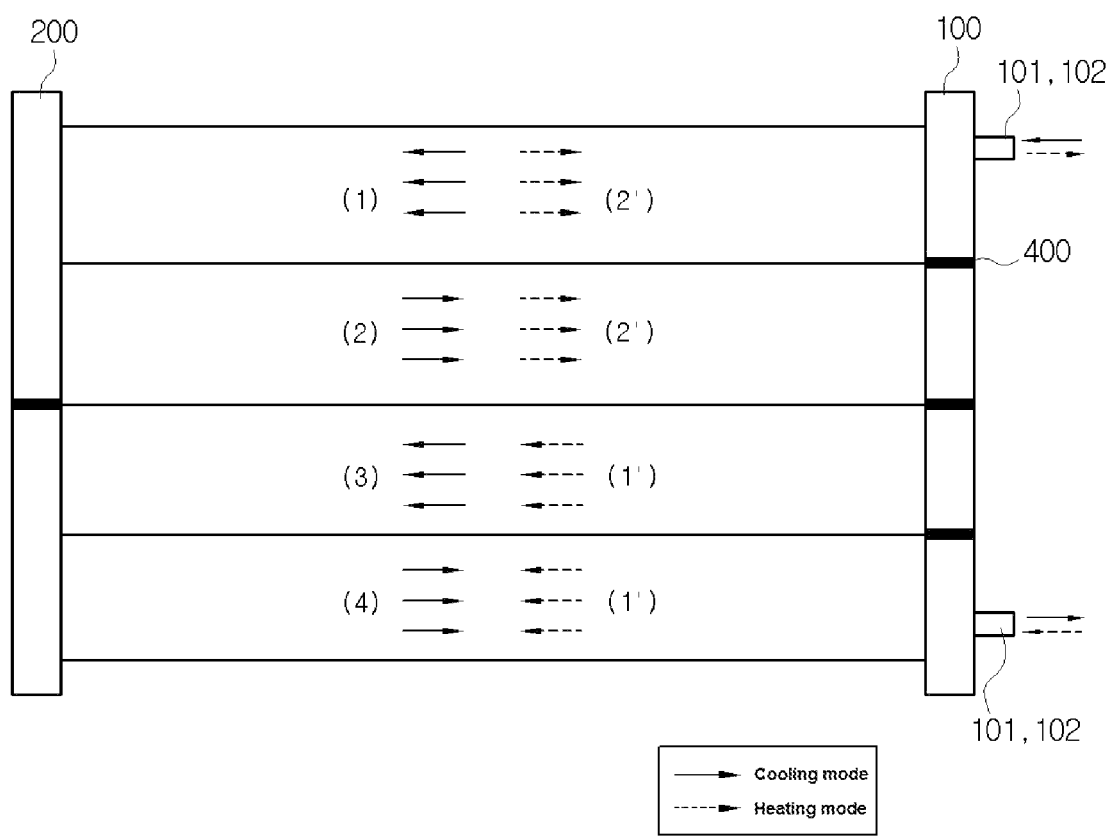

The outdoor heat exchanger according to the exemplary embodiment of the present invention includes an example in which a position of an inlet 101 into which a refrigerant is introduced and a position of an outlet 102 through which the refrigerant is discharged are the same even if it is switched to the cooling or heating mode, as illustrated in FIGS. 5 to 10 and an example in which the position of the inlet 101 into which the refrigerant is introduced and the position of the outlet 102 through which the refrigerant is discharged are changed to change the flow direction of the refrigerant when it is switched to the cooling or heating mode, as illustrated in FIGS. 19 to 21.

First, the outdoor heat exchanger according to the exemplary embodiment illustrated in FIGS. 5 to 10 will be described.

The outdoor heat exchanger 1 is configured to largely include a first header tank 100, a second header tank 200, a tube 300, a fin 400, a receiver dryer 500, a switching baffle 600, a variable baffle 701, and a second variable baffle 702.

The first header tank 100 and the second header tank 200 have the refrigerant introduced thereinto or discharged therefrom and are disposed in parallel while being spaced apart from each other by a predetermined distance in a height direction or a longitudinal direction.

The receiver dryer 500 includes a body 530, a first connection part 510 connected between the second header tank 200 and the body 530 to guide the refrigerant to be introduced into the body 530, and a second connection part 520 to guide the refrigerant to be discharged.

The tube 300 has both ends fixed to the first header tank 100 and the second header tank 200 to form a channel of the refrigerant. Here, a plurality of tubes 300 are disposed in parallel in a longitudinal direction and a fin 400 is interposed between the tubes 300 to increase a heat transfer area.

The switching baffle 600 is disposed in the first header tank 100 or the second header tank 200 to control the flow of the refrigerant.

At this point, unlike the switching baffle 600 that closes the channel to control the flow of the refrigerant, the first variable baffle 701 may be disposed in the first header tank 100 or the second header tank 200 and controlled to be opened and closed to induce or block the flow of the refrigerant and the second variable baffle 701 may also be disposed in the first connection part 510 or the second connection part 520 and may block the channel not to pass the refrigerant through the receiver dryer 500 and open the channel to pass the refrigerant through the receiver dryer 500 as needed.

At this point, the first variable baffle 701 and the second variable baffle 702 may be controlled to be opened or closed according to a change in temperature of the refrigerant according to the switching of the cooling and heating modes of the vehicle heat pump system and may be made of a shape memory alloy so that the shapes thereof may be changed according to the change in temperature and may be made of bi-metal so that the positions thereof may be changed.

The first variable baffle 701 and the second variable baffle 702 may be integrally brazed upon assembling of the outdoor heat exchanger 1 like the switching baffle 600. For this purpose, the first variable baffle 701 and the second variable baffle 702 may be preferably formed including a material having a melting point higher than that of aluminum.

First, describing, by way of example, the down flow type outdoor heat exchanger 1 as illustrated in FIGS. 5 to 8, the first header tank 100 and the second header tank 200 may be disposed in parallel while being spaced apart from each other by a predetermined distance in a height direction and the first header tank 100 may be configured to include an inlet tank 110 that extends in a longitudinal direction to be introduced with the refrigerant and an outlet tank 120 that is disposed on the inlet tank 110 in parallel with the inlet tank 110 in the height direction to discharge the refrigerant.

The inlet tank 110 and the outlet tank 120 are formed such that the other ends thereof formed with the inlet and the outlet are formed to be connected to each other through a communication path 130.

Accordingly, in the illustrated down flow type outdoor heat exchanger 1, the refrigerant is introduced through the inlet tank 110 and then flows to the second header tank 200 along the tube 300 and passes through the receiver dryer 500 and then is discharged through the outlet tank 120 along the tube 300 again.

At this point, in the outdoor heat exchanger 1, the switching baffle 600 is installed within the inlet tank 110 between the last pass and a pass just before the last pass through which the refrigerant passes so that the refrigerant passing through the last pass may flow into the outlet tank 120 along the communication path 130 without flowing into the inlet tank 110 again.

In particular, the outdoor heat exchanger 1 of the exemplary embodiment of the present invention is formed so that the position of the inlet 101 into which the refrigerant is introduced and the position of the outlet 102 through which the refrigerant is discharged are the same even if it is switched to the cooling or heating mode. That is, the down flow type outdoor heat exchanger 1 as illustrated in FIGS. 5 and 8 is formed so that the refrigerant is introduced into the inlet tank 110 in both the cooling mode and the heating mode and the refrigerant is discharged to the outlet tank 120.

Figure 1:
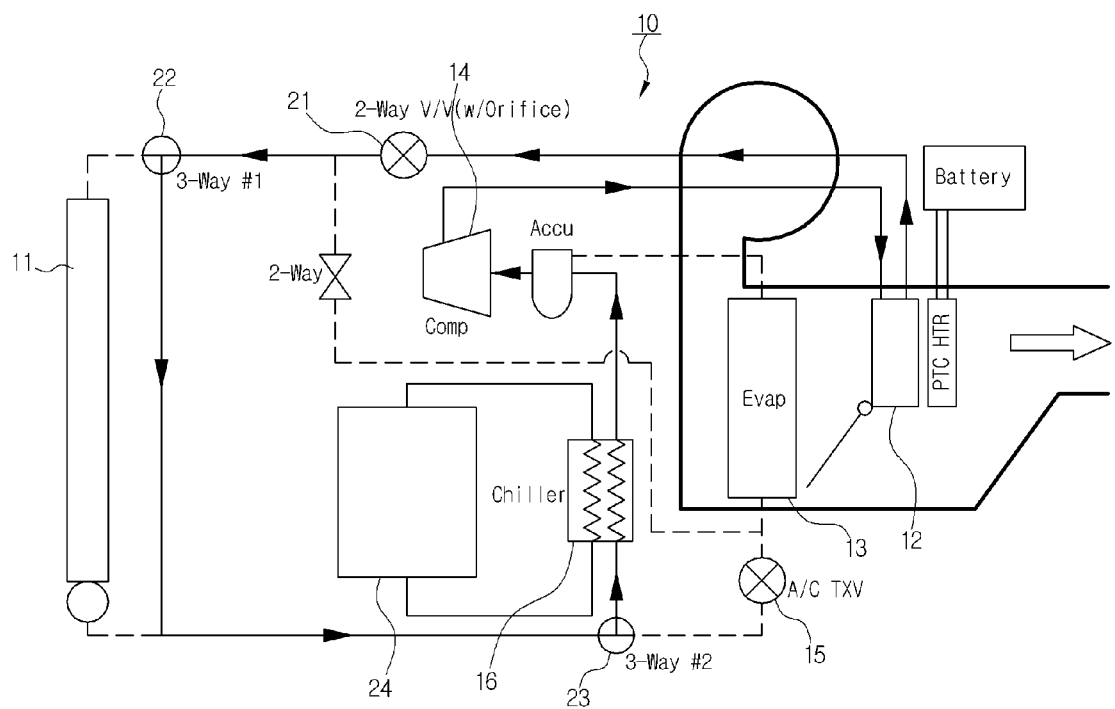
FIG. 1 is a schematic view illustrating a heating cycle of the existing vehicle heat pump system.
Figure 2:
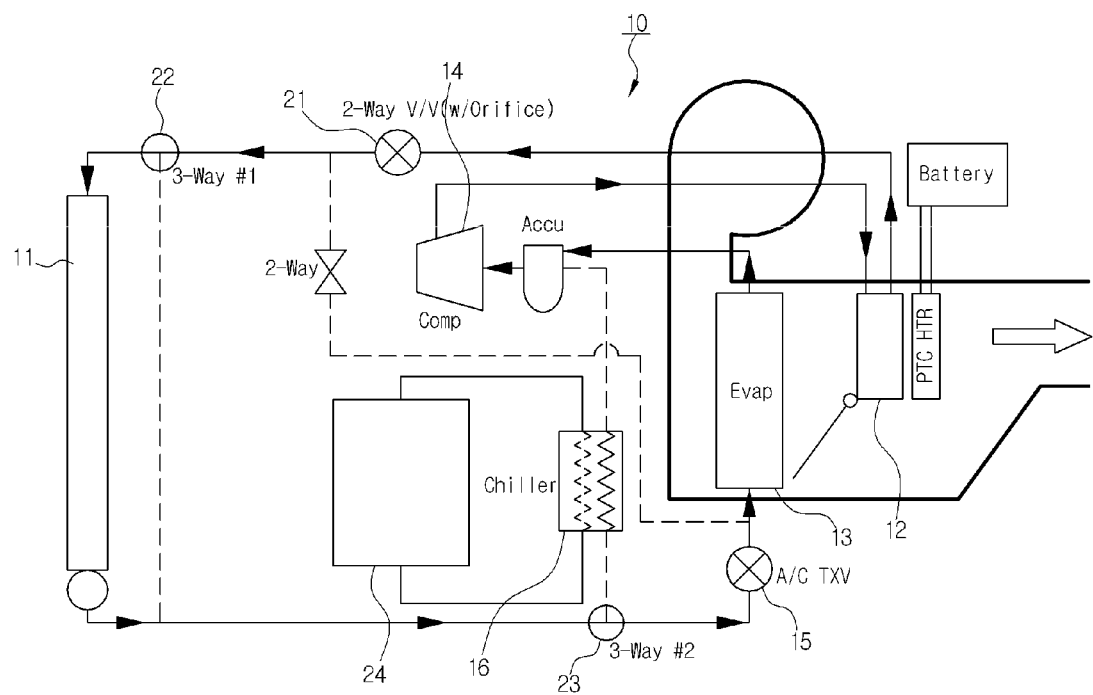
FIG. 2 is a schematic view illustrating a cooling cycle of the existing vehicle heat pump system.
Figure 3:
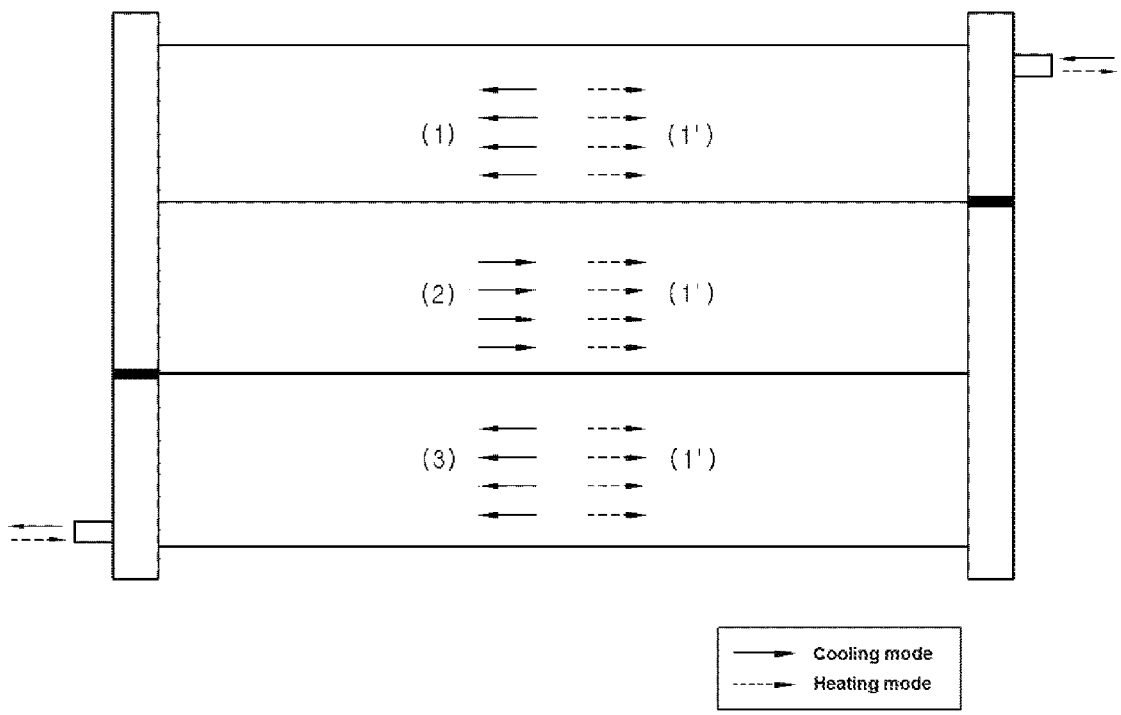
FIG. 3 is a view illustrating an outdoor heat exchanger in which there is no change in positions of an inlet and an outlet upon switching of cooling and heating modes.
Figure 4:
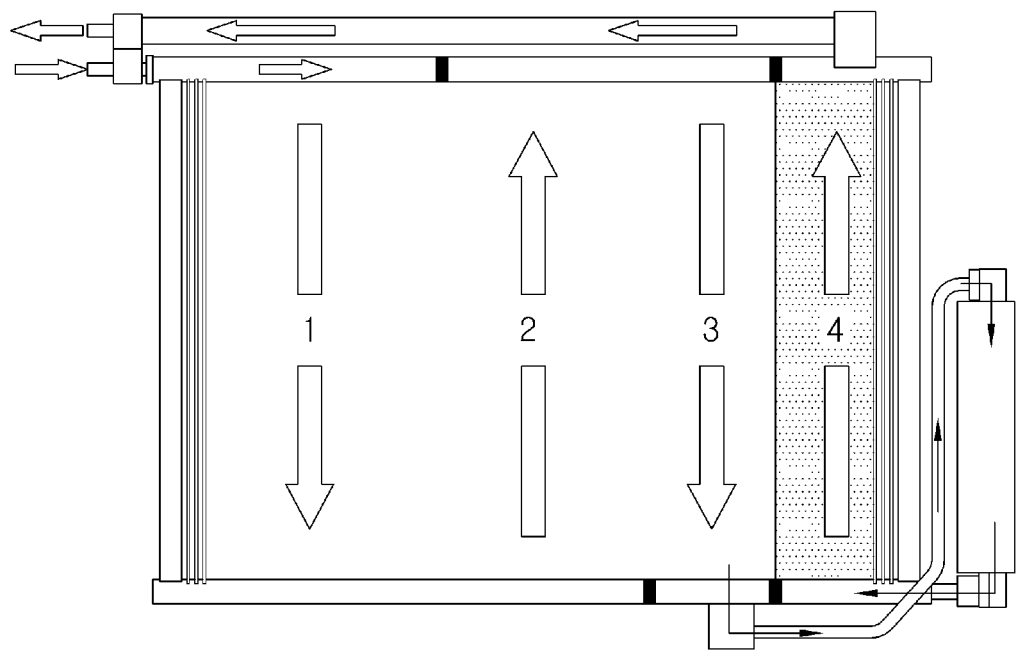
FIG. 4 is a view illustrating an outdoor heat exchanger in which the positions of the inlet and the outlet are changed upon the switching of the cooling and heating modes.
Figure 5:
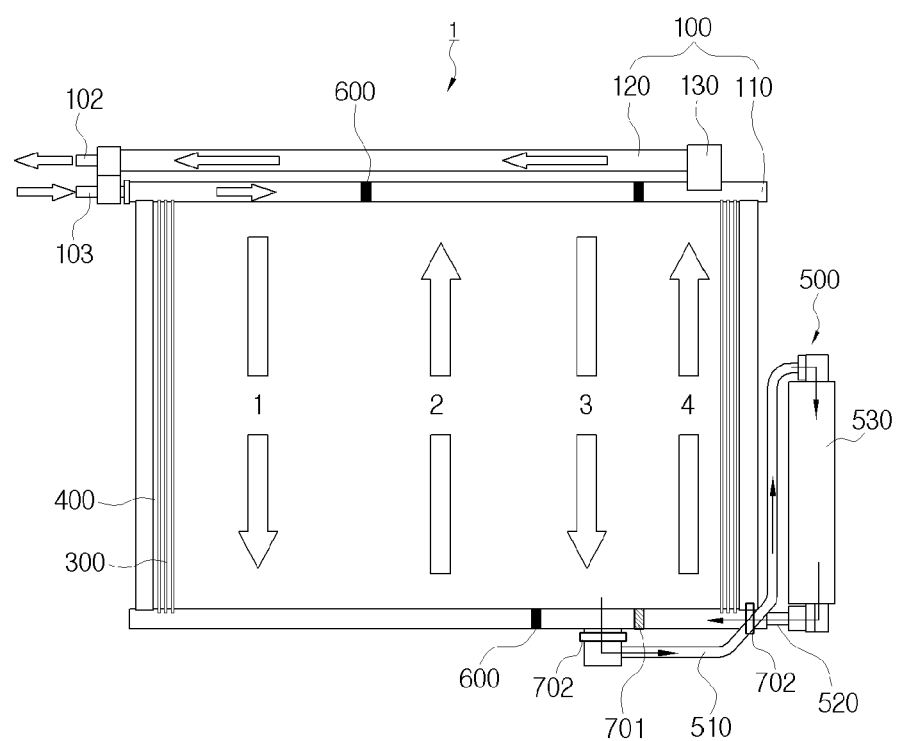
FIGS. 5 to 8 are views illustrating a flow of a refrigerant in cooling and heating modes in a down flow type outdoor heat exchanger among outdoor heat exchangers according to an exemplary embodiment of the present invention.
Figure 6:
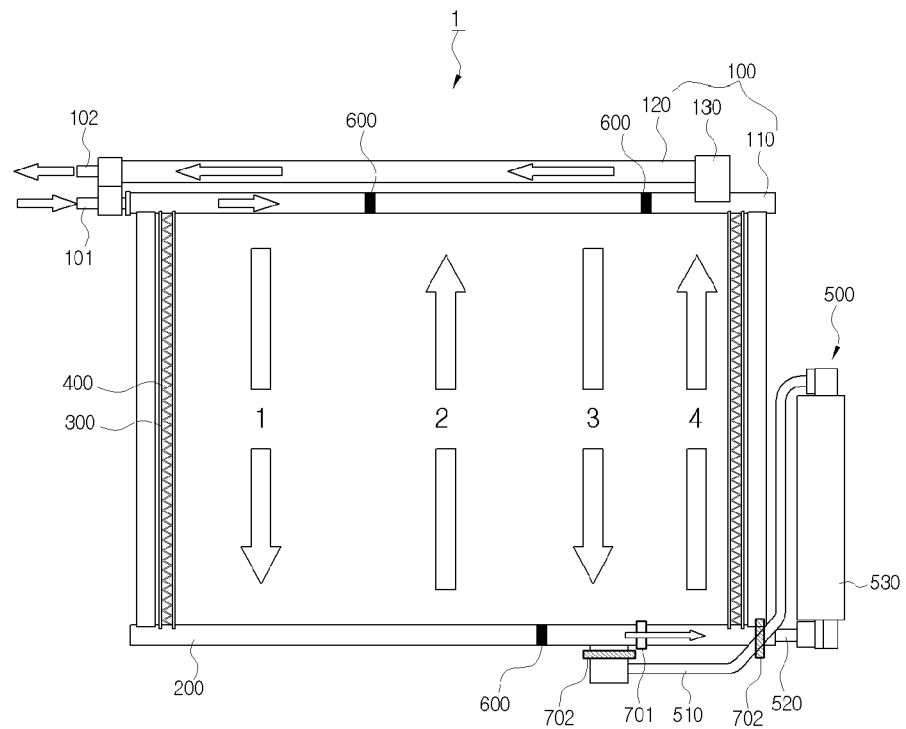
Figure 7:
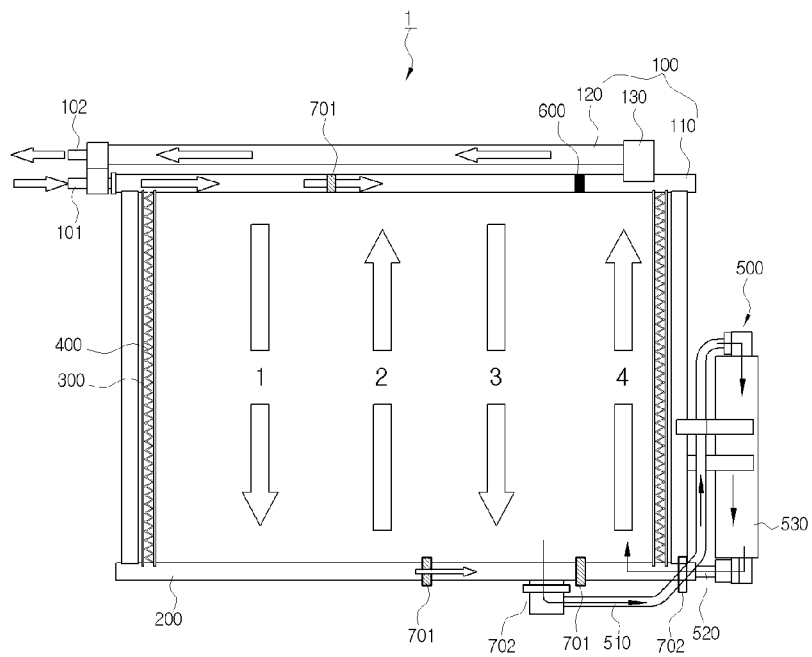
Figure 8:
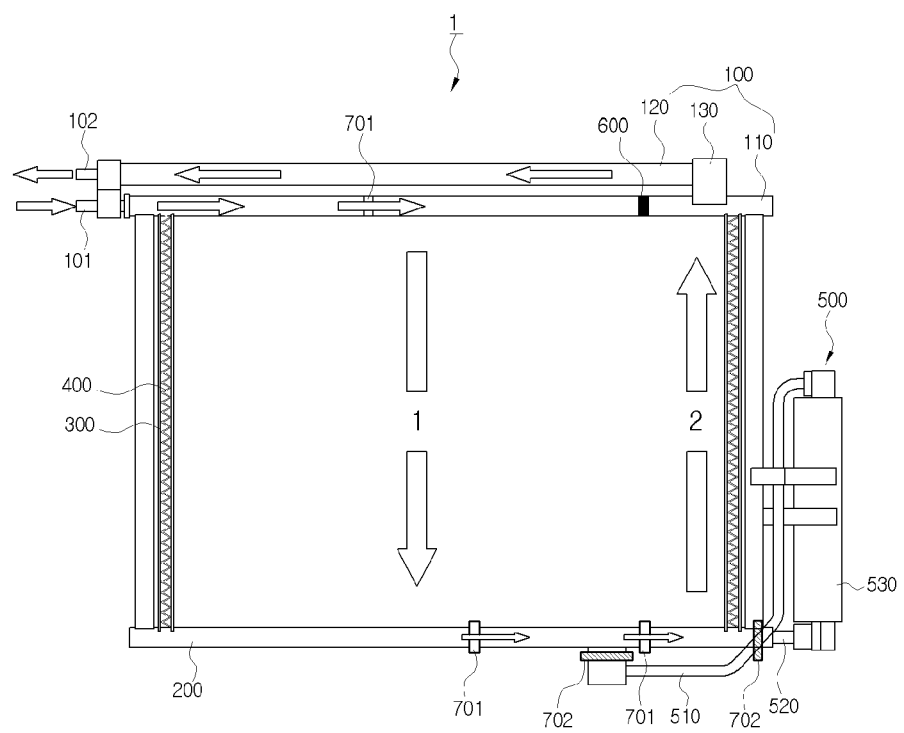

The outdoor heat exchanger 1 of the exemplary embodiment of the present invention may also be formed so that the number of refrigerant flow paths in the cooling mode is equal to the number of refrigerant flow paths in the heating mode, as illustrated in FIGS. 5 and 6 and the number of refrigerant flow passes in the cooling mode is larger than the number of the refrigerant flow paths, as illustrated in FIGS. 7 and 8.

According to the outdoor heat exchanger 1 of the vehicle heat pump system, the refrigerant amount flowing into the outdoor heat exchanger 1 in the heating mode is smaller than that in the cooling mode. If the number of refrigerant flow passes is large, the amount of pressure drop on the refrigerant side increases during the flow of the refrigerant and thus the temperature of the refrigerant decreases, thereby causing the problem in that the frosting phenomenon is accelerated.

Therefore, the outdoor heat exchanger 1 according to the exemplary embodiment of the present invention has a 4-pass refrigerant pass in the cooling mode as illustrated in FIG. 7 and a 2-pass refrigerant pass in the heating mode as illustrated in FIG. 8, thereby retarding the frosting phenomenon as described above.

Of course, the outdoor heat exchanger 1 according to the exemplary embodiment of the present invention does not necessarily have 4-pass refrigerant pass in the cooling mode and therefore may also have a 6 pass and may also be configured to have a 3 pass as well as a 2 pass even in the heating mode.

Describing the outdoor heat exchanger 1 illustrated in FIGS. 5 and 6, two switching baffles 600 are disposed within the inlet tank 110 of the first header tank 100 by a predetermined interval, one switching baffle 600 is disposed at a front end of the second header tank 200 in the refrigerant flow direction, and a first variable baffle 701 is disposed at a rear end thereof, such that the outdoor heat exchanger 1 according to the exemplary embodiment of the present invention may have a 4-pass channel in the cooling and heating modes.

At this point, the switching baffle 600 disposed at the rear end in the refrigerant flow direction of the first header tank 100 is disposed between the 3 pass and 4 pass, and the refrigerant passing through the 4-pass flows toward the outlet tank 120 of the first header tank 100. Further, the first variable baffle 701 disposed in the second header tank 200 is disposed between a first connection part 510 and a second connection part 520 that are connected to the receiver dryer 500 and thus serves to make the refrigerant bypass the receiver dryer 500 in the heating mode along with the second variable baffle 702.

Accordingly, in the outdoor heat exchanger 1 according to the exemplary embodiment of the present invention, in the cooling mode, the first variable baffle 701 is closed and the second variable baffle 702 is opened, so that the 3-pass refrigerant may reach the 4 pass via the receiver dryer 500 and in the heating mode, the first variable baffle 701 is opened and the second variable baffle 702 is closed so that the 3-pass refrigerant may directly reach the 4 pass.

As described above, when the outdoor heat exchanger 1 of the vehicle heat pump system is used as the condenser during the cooling, the high-temperature and high-pressure refrigerant flows thereinto, and when it is used as the evaporator during the heating, the low-temperature and low-pressure refrigerant flows thereinto, such that the first variable baffle 701 is closed at the time of reacting to the high-temperature refrigerant and is opened at the time of reacting to the low-temperature refrigerant.

On the contrary, the second variable baffle 702 is opened at the time of reacting to the high-temperature refrigerant and is closed at the time of reacting to the low-temperature refrigerant.

Next, describing the outdoor heat exchanger 1 with reference to FIGS. 7 and 8, the first variable baffle 701 is disposed at the front end in the refrigerant flow direction within the inlet tank 110 of the first header tank 100, the switching baffle 600 is disposed at the rear end while being spaced apart therefrom by a predetermined interval, and two first variable baffles 701 are disposed within the second header tank 200 at a predetermined interval, such that the outdoor heat exchanger 1 according to the exemplary embodiment of the present invention may have the 4-pass channel in the cooling mode and the 2-pass channel in the heating mode.

In the cooling mode, all of the first variable baffles 701 are closed and the second variable baffle 702 is opened, and thus the refrigerant flowing into the inlet tank 110 flows through the 3 pass to reach the 4 pass via the receiver dryer 500 and in the heating mode, all of the first variable baffles 701 are opened and the second variable baffle 702 is closed, and thus the 1-pass refrigerant directly reaches the 2 pass without passing through the receiver dryer 500 and then passes through the communication path 130 to be discharged to the outlet tank 120.

Figure 9:
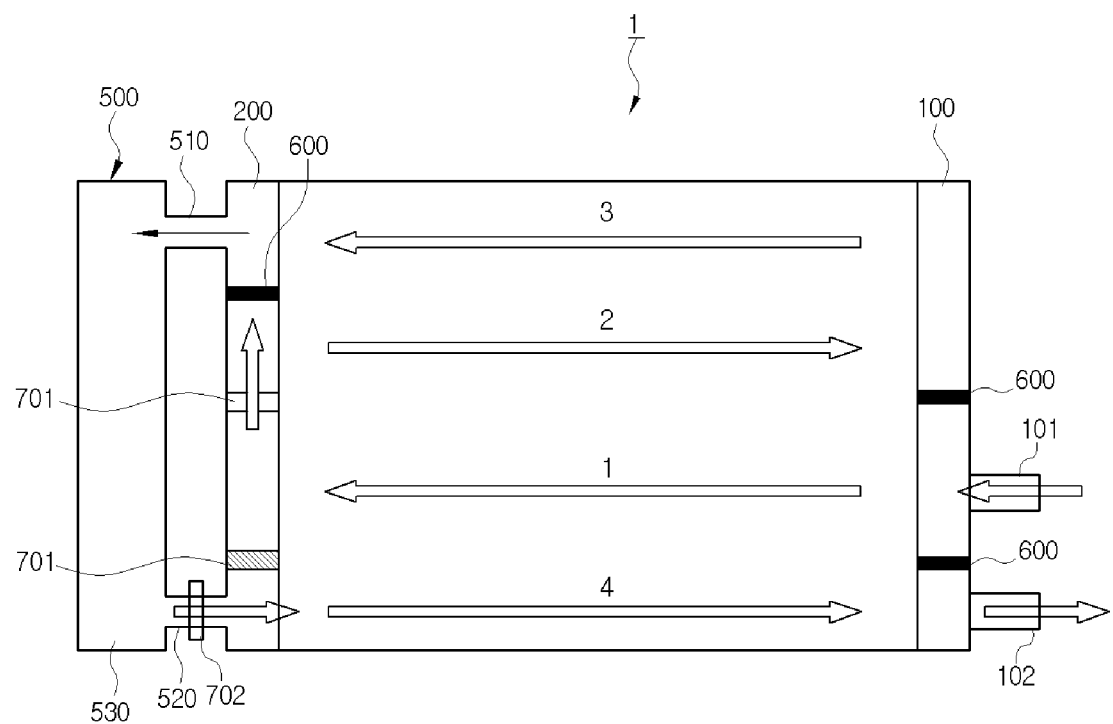
FIGS. 9 and 10 are views illustrating a flow of a refrigerant in cooling and heating modes in a cross-flow type outdoor heat exchanger among the outdoor heat exchangers according to the exemplary embodiment of the present invention.
Figure 10:
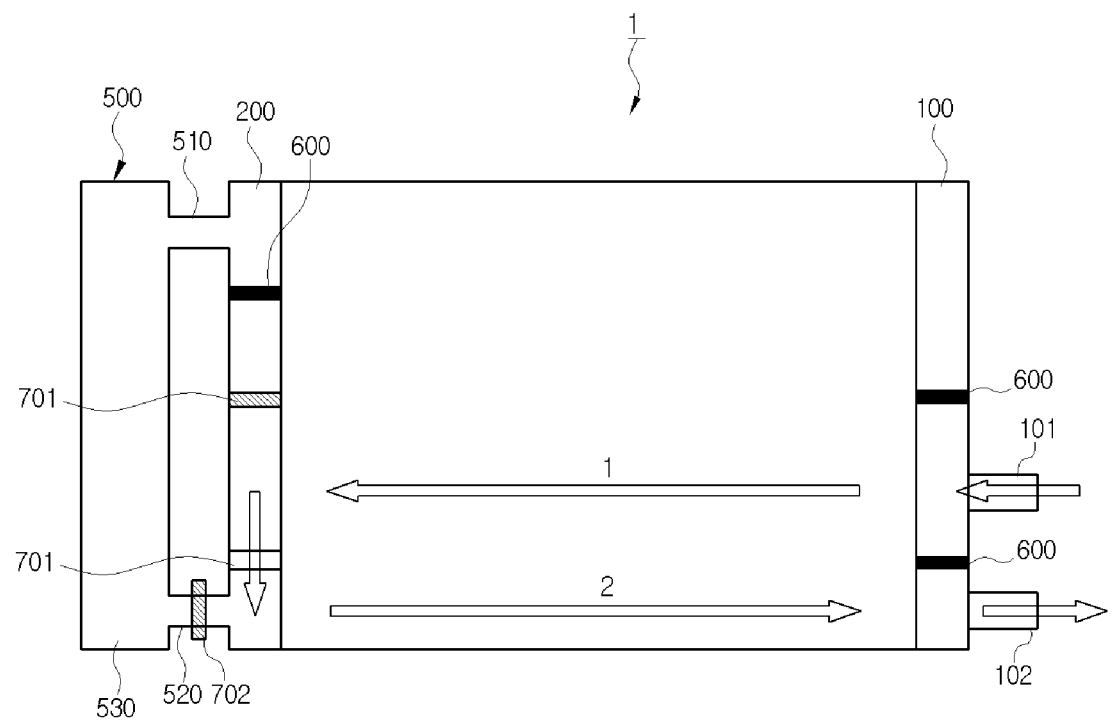
Figure 11:
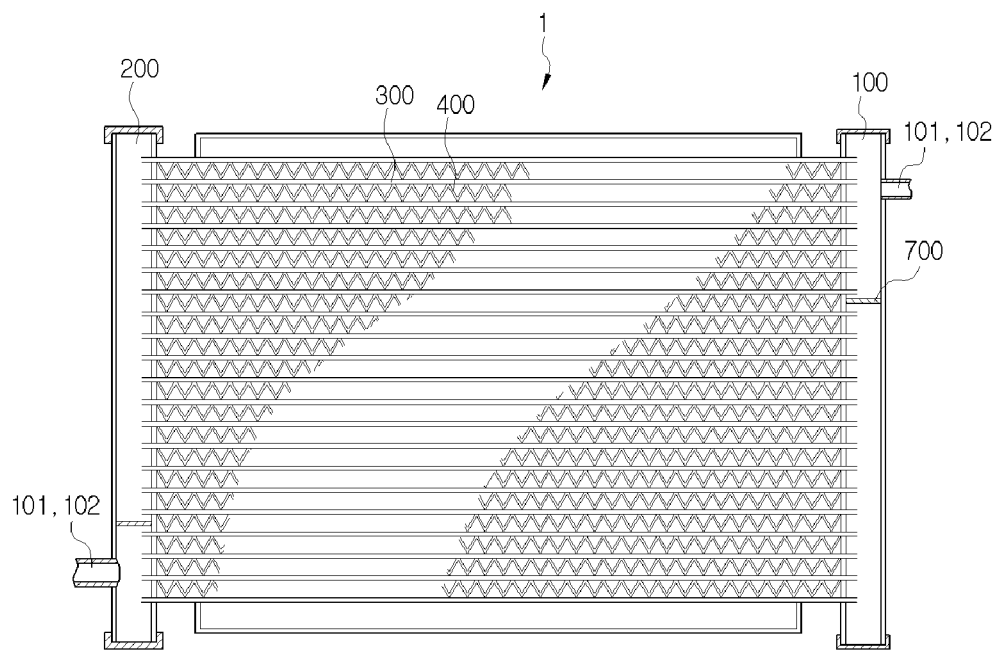
FIG. 11 is a front cross-sectional view illustrating the outdoor heat exchanger according to the exemplary embodiment of the present invention.
Figure 12:
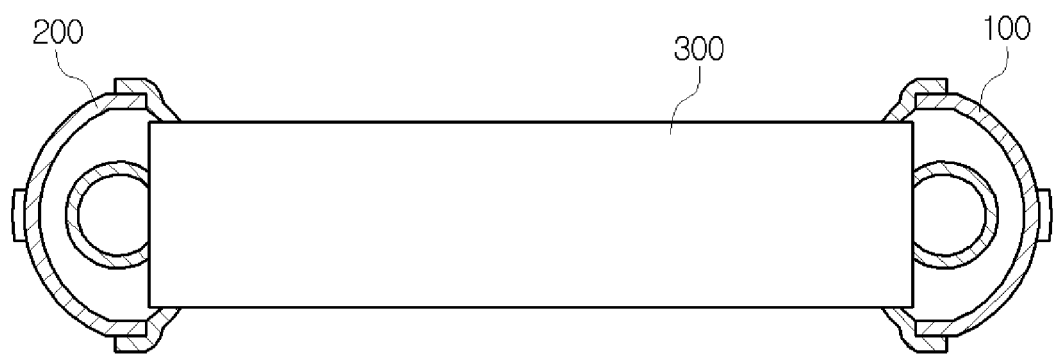
FIG. 12 is a view illustrating a state in which the outdoor heat exchanger according to the exemplary embodiment of the present invention is placed in a brazing furnace.

In another exemplary embodiment, as illustrated in FIGS. 9 and 10, the outdoor heat exchanger 1 according to the exemplary embodiment of the present invention may be formed in the cross flow type.

That is, the first header tank 100 and the second header tank 200 may be disposed in parallel while being spaced apart from each other by a predetermined distance in the longitudinal direction.

According to the outdoor heat exchanger 1 illustrated in FIGS. 9 and 10, the two switching baffles 600 spaced apart from each other by a predetermined distance in the height direction are disposed in the first header tank 100, one switching baffle 600 is under the first connection part 510 in the second header tank 200, and the two first variable baffles 701 are disposed between the first connection part 510 and the second connection part 520 while being spaced apart from each other by a predetermined distance under the switching baffle 600.

At this point, the opened and closed states of the first variable baffles 701 in response to temperature are reversed to each other. Here, the first variable baffle 701 located at the upper side is opened at the time of reacting to the high-temperature refrigerant and is closed at the time of reacting to the low-temperature refrigerant. In the outdoor heat exchanger 1 according to the exemplary embodiment of the present invention, the second variable baffle 702 may be disposed at both the first connection part 510 and the second connection part 520 but as illustrated in FIGS. 8 and 9, even if the second variable baffle 702 is disposed only at the second connection part 520, the refrigerant flowing into the receiver dryer 500 may be blocked.

Describing the flow of the refrigerant with reference to FIG. 9, upon the cooling, the refrigerant flowing into the inlet 101 of the first header tank 100 flows into the second header tank 200 along the tube 300 (1 pass) and then moves upwardly, and again flows into the first header tank 100 along the tube 300 (2 pass) and then moves upwardly to reach the second header tank 200 along the tube 300 (3 pass) again.

Next, the refrigerant passes through the receiver dryer 500 through the first connection part 510 and then flows into the second header tank 200 along the second connection part 520. Then, the refrigerant is discharged through the outlet 102 of the first header tank 100 along the tube 300 (4 pass). Accordingly, the outdoor heat exchanger 1 according to the exemplary embodiment of the present invention includes the first variable baffle 701 and the second variable baffle 702 whose opening and closing are controlled according to the change in the refrigerant temperature due to the switching of the cooling and heating modes, thereby controlling the channel to prevent the refrigerant from passing through the receiver dryer 500 during the heating as well as changing the number of columns of the tube 300 for each pass.

That is, according to the exemplary embodiment of the present invention, the inlet/outlet of the refrigerant need not be changed at the time of the switching to the cooling or heating mode, and therefore the additional switching valve is not required, such that it is possible to reduce the weight of the system, save costs, and prevent the frosting phenomenon from being accelerated due to the increase in the amount of pressure drop on the refrigerant side occurring while passing through the receiver dryer 500 in the heating mode.

Next, the outdoor heat exchanger according to the exemplary embodiment of the present invention and the variable baffle included in the outdoor heat exchanger in illustrated in FIGS. 11 to 21 will be described.

In particular, the outdoor heat exchanger 1 according to the exemplary embodiment of the present invention forms the refrigerant flow reversely when the cooling and heating modes are switched, and is configured to largely include the first header tank 100, the second header tank 200, the tube 300, the fin 400, and the variable baffle 700.

The first header tank 100 and the second header tank 200 have the refrigerant flowing thereinto or discharged therefrom. In the case of the cross flow type, the first header tank 100 and the second header tank 200 are disposed in parallel while being spaced apart from each other by a predetermined distance in the longitudinal direction and in the case of the down flow type, the first header tank 100 and the second header tank 200 are disposed in parallel while being spaced apart from each other by a predetermined distance in the width direction.

In the case of the exemplary embodiment illustrated in FIGS. 19 to 21, in the cooling mode, the refrigerant is introduced into the first header tank 100 and discharged to the second header tank 200, and in the heating mode, the refrigerant is introduced into the first header tank 200 and discharged to the first header tank 100.

The tube 300 has both ends fixed to the first header tank 100 and the second header tank 200 to form a channel of the refrigerant. Here, the plurality of tubes 300 are disposed in parallel in the longitudinal direction and the fin 400 is interposed between the tubes 300 to increase the heat transfer area.

The variable baffle 700 is disposed in the first header tank 100 and the second header tank 200 and is controlled to be opened and closed according to the switching of the cooling and heating modes and may be configured to include a first fixing means 710, a second fixing means 720, an opening and closing means 730, and a clad barrier wall 740. The first fixing means 710 is inserted into a baffle insertion groove formed in the first header tank 100 or a third header tank and is configured to include a first refrigerant flow hole 711 of which the certain region of the center is hollow, unlike the existing baffle.

The second fixing means 720 may be coupled and fixed to a plurality of seating protrusions 721 by contacting the plurality of seating protrusions that are protruding from an edge of one side of the first fixing means 710 while being spaced apart from each other by a predetermined interval in a circumferential direction and may be provided with a plurality of second refrigerant flow holes 722 formed by hollowing a certain region thereof.

Figure 13:
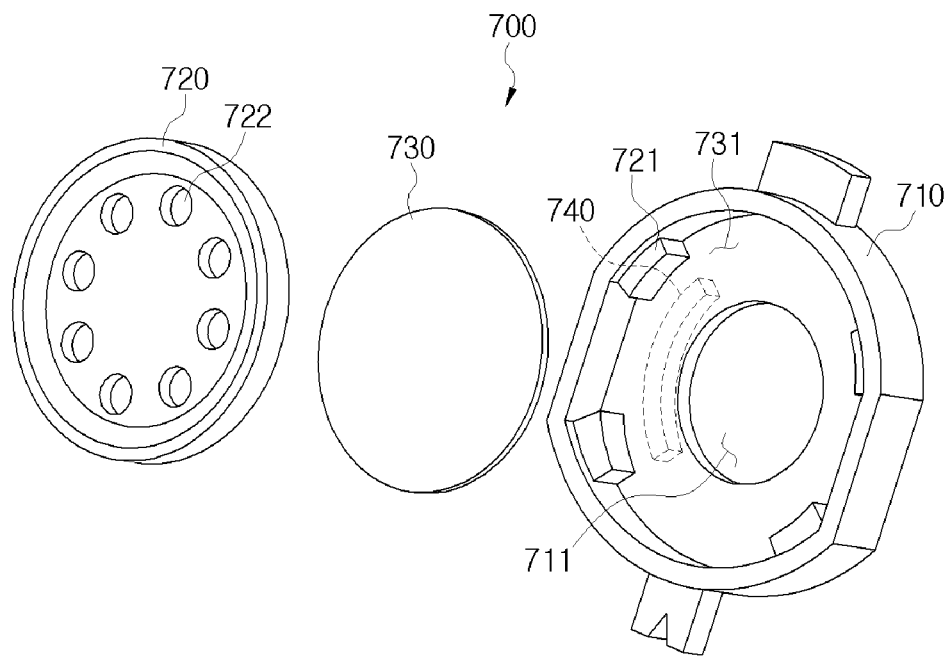
FIGS. 13 and 14 are an exploded perspective view and a plan view illustrating a variable baffle of the outdoor heat exchanger according to the exemplary embodiment of the present invention.

At this point, the second refrigerant flow hole 722 is hollow in a certain region of the second fixing means 720. Here, at least one second refrigerant flow hole 722 may be formed. That is, as illustrated in FIG. 13, the plurality of second refrigerant flow holes 722 may be formed in the second fixing means 720 while being spaced apart from each other by a predetermined distance in a circumferential direction.

In yet another exemplary embodiment, at least one second refrigerant flow hole 722 may be formed while a certain region of an outer circumferential surface of the second fixing means 720 is dug inwardly, and as illustrated in FIG. 7, when four second refrigerant flow holes 722 are formed while being spaced apart from each other at approximately 90°, the second fixing means 720 may be formed in a cross shape.

The opening and closing means 730 is disposed in a space part 731 between the first fixing means 710 and the second fixing means 720 formed by the seating protrusion 721 and linearly moves within the space part 731 in the refrigerant flow direction by the pressure generated by the refrigerant flow.

That is, when the refrigerant flows from the second fixing means 720 toward the first fixing means 710, the opening/closing means 730 closes the first refrigerant flow hole by contacting the first fixing means 710 to switch the flow direction and when the refrigerant flows from the first fixing means 710 toward the second fixing means 720, opens the first refrigerant flow hole to allow the refrigerant to flow through the space between the seating protrusions 721.

Meanwhile, in order to secure the performance of the heat exchanger, the fin 400 generally has a height of about 4 to 8 mm, and the tube 300 has a thickness of 1 to 2 mm. Therefore, the variable baffle 700 should be formed within 6 mm, and therefore the first fixing means 710, the second fixing means 720, and the opening and closing means 730 should be formed as thin as possible. Further, the variable baffle 700 should be installed at a predetermined interval from the tube 300, and therefore should be configured within about 5 mm and the space part 731 may be within approximately 2 mm considering the thickness of the first fixing means 710 and the second fixing means 720.

In the outdoor heat exchanger 1 according to the exemplary embodiment of the present invention, the respective parts are coupled by the brazing. For this purpose, the outdoor heat exchanger is placed in the brazing furnace in parallel to a base surface in the state illustrated in FIG. 5. At this point, the clad is melted to weld the respective parts. When the clad moves, the clad is biased in the direction of gravity, such that the clad is more gathered at the lower portion of the header tank than the upper portion thereof and brazed, such that the problem in that the opening and closing means 730 is welded to the first fixing means 710 or the second fixing means 720 may occur.

Therefore, in the variable baffle 700 disposed in the outdoor heat exchanger 1 according to the exemplary embodiment of the present invention, the other side of the first fixing means 710, that is, the opposite side contacting the opening/closing means 730 is further provided with the clad barrier wall 740 protruding at the certain region of the outer side of the first refrigerant flow hole.

At this point, the clad barrier wall 740 is formed over the first refrigerant flow hole on the basis of the state in which the outdoor heat exchanger 1 is placed in the brazing furnace, and is formed outside the opening/closing means 730 so as to prevent the clad from flowing down, thereby preventing the opening/closing means 730 from being welded to the first fixing means 710 or the second fixing means 720.

Figure 14:
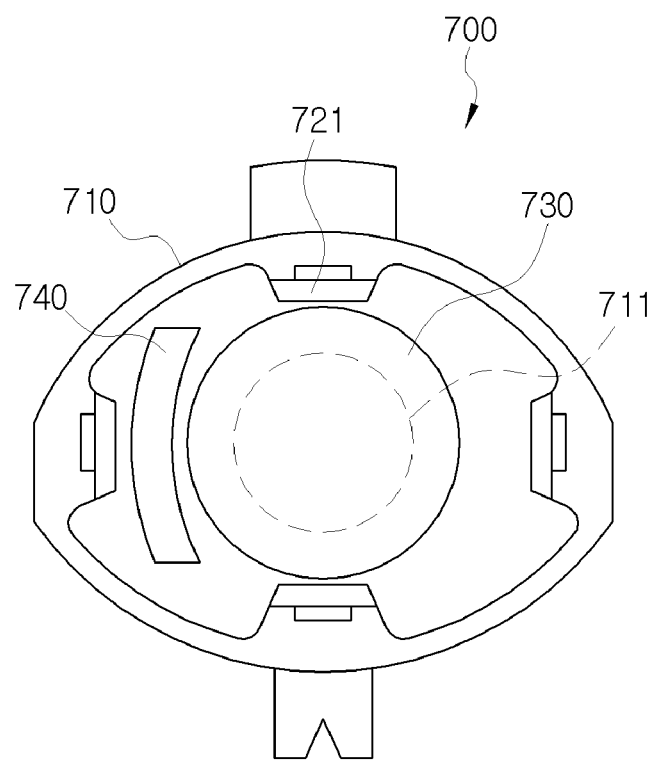

Referring to FIGS. 13 and 14, in the variable baffle 700, the plurality of seating protrusions 721 are spaced apart from each other by a predetermined interval along the inner circumferential surface of the first fixing means 710 and the clad barrier wall 740 is preferably formed in the space between the seating protrusion 721 and the opening/closing means 730.

The variable baffle 700 is configured so that the space part 731 is formed between the first fixing means 710 and the second fixing means 720 by a height at which the seating protrusion 721 protrudes.

Figure 15:
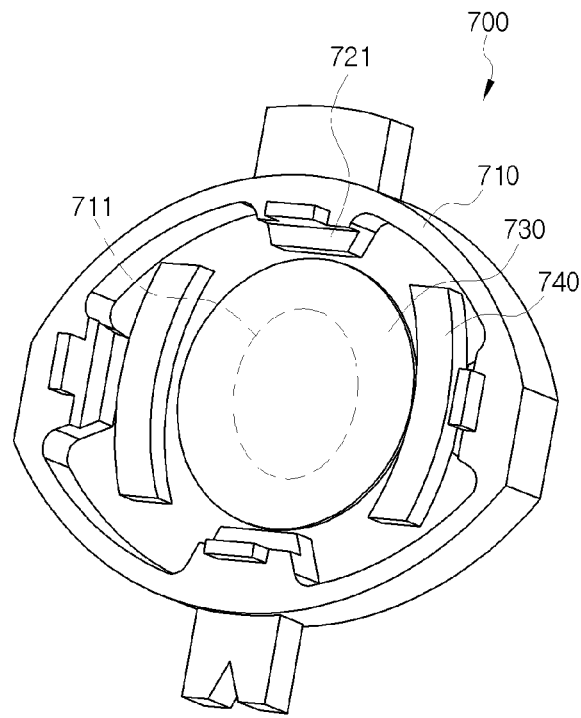
FIGS. 15 and 16 are views illustrating various examples of the variable baffle.
Figure 16:
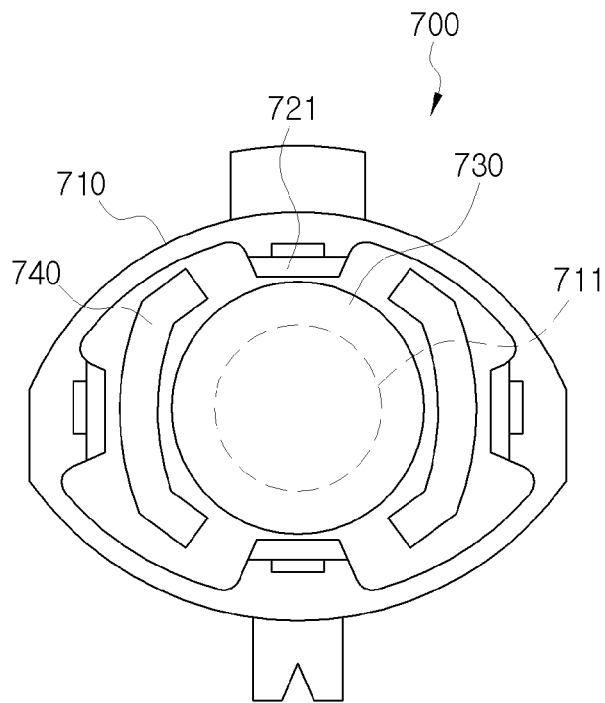

The clad barrier wall 740 may be formed on the opposite side contacting the opening and closing means 730 of the first fixing means 710 as illustrated in FIG. 13 and may be formed on the surface contacting the opening and closing means 730 as illustrated in FIGS. 14 to 16.

Further, the clad barrier wall 740 may be changed in various forms. As illustrated in FIG. 15, the clad barrier wall 740 may be formed in an outer region located at one side or both sides in the width direction of the outdoor heat exchanger 1 of the first refrigerant flow hole, that is, at both of the upper and lower portions of the first refrigerant flow hole on the basis of the state in which the outdoor heat exchanger 1 is placed in the brazing furnace and may also be formed over the whole region of the outer side of the first refrigerant flow hole as illustrated in FIG. 16.

Figure 17:
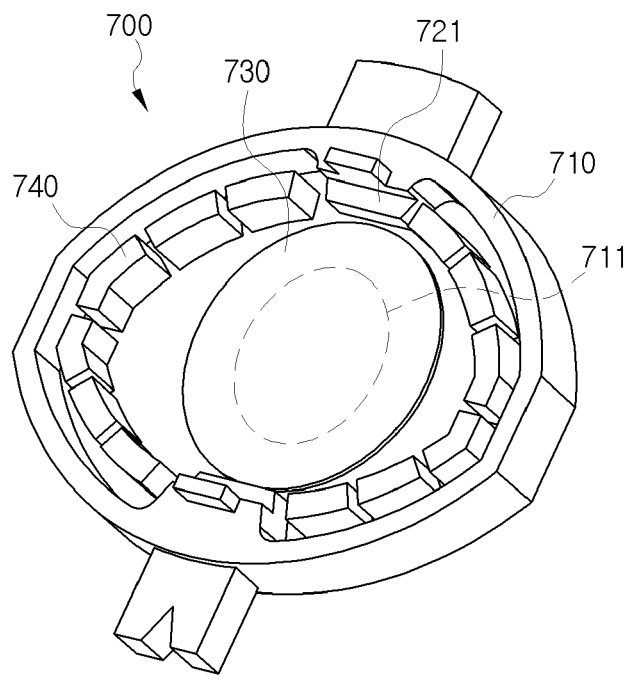
FIG. 17 is a perspective view illustrating another exemplary embodiment of the variable baffle.
Figure 18:
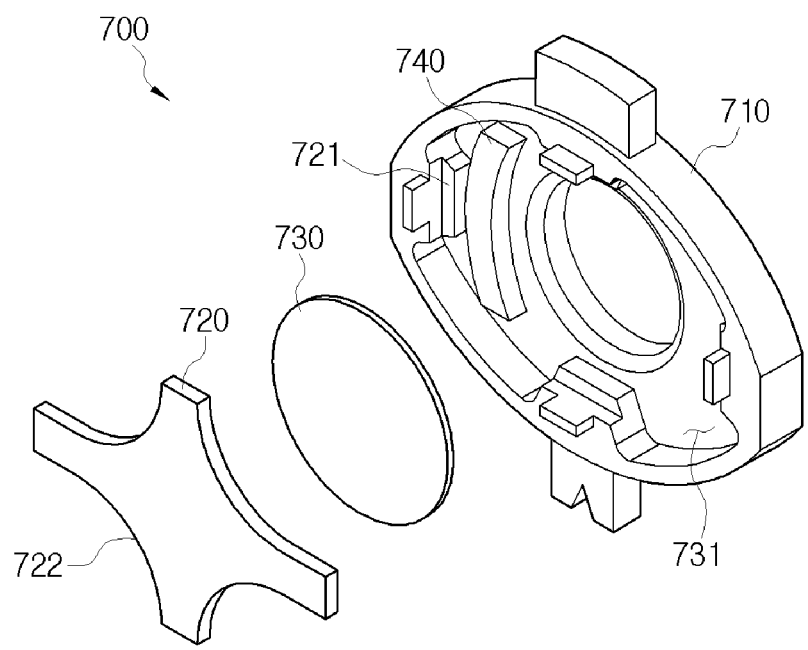
FIG. 18 is an exploded perspective view illustrating still another exemplary embodiment of the variable baffle.

In the variable baffle 700 illustrated in FIG. 16, the clad barrier wall 740 protrudes along the inner circumferential surface of the first fixing means 710 at the outer side of the first refrigerant flow hole and the opening and closing means 730 and may be formed in the remaining region other than the region in which the seating protrusion 721 is formed. According to another exemplary embodiment, as illustrated in FIG. 17, the clad barrier wall 740 may also protrude at a predetermined interval over the whole region of the outer side of the first refrigerant flow hole.

As a result, the clad that is melted and flows down at the time of brazing moves the interfaces or the edge portions of the respective parts due to the capillary phenomenon, and the clad barrier wall 740 may prevent the opening and closing means 730 from being welded to the first fixing means 710 or the second fixing means 720 since the clad moves toward the opening and closing means 730 due to the principle.

Meanwhile, in the outdoor heat exchanger 1 according to the exemplary embodiment of the present invention, the number of refrigerant passes may be changed in the cooling and heating mode by adjusting the installation directions, the number, and the positions of variable baffles 700.

As illustrated in FIGS. 19 and 21, the variable baffle 700 is coupled with the first header tank 100 or the second header tank 200 so that the second fixing means 720 of the variable baffle 700 is disposed on the front surface in the refrigerant flow direction in the cooling mode, and thus the refrigerant flow direction is switched by the variable baffle 700 in the cooling mode and the number of refrigerant passes may be further reduced by passing the refrigerant through the variable baffle 700 in the heating mode.

In the outdoor heat exchanger 1 of FIG. 19, the variable baffle 700 is disposed in each of the first header tank 100 and the first header tank 200 one by one and has the 3-pass refrigerant flow in the cooling mode and the 1-pass refrigerant flow in the heating mode.

More specifically, in the outdoor heat exchanger 1 of FIG. 19, in the cooling mode, the refrigerant is introduced into the inlet 101 formed in the first header tank 100, flows into the first header tank 200 along the tube 300, and moves downwardly and the refrigerant flow direction is changed by the variable baffle 700 formed in the first header tank 200 and thus the refrigerant again flows into the first header tank 100 along the tube 300.

Next, the refrigerant moves downward from the first header tank 100, again flows into the first header tank 200 along the tube 300, and is discharged through the outlet 102.

In the heating mode, in the outdoor heat exchanger 1 of FIG. 19, the positions of the inlet 101 and the outlet 102 are changed to each other, and thus the refrigerant flow direction is also reversed.

In the outdoor heat exchanger, the refrigerant is introduced into the inlet 101 formed in the first header tank 200, and then some thereof moves upwardly and the rest thereof flows into the first header tank 100 along the tube 300.

At this point, in the variable baffle 700 installed in the first header tank 200, the opening/closing means 730 moves upwardly due to the pressure generated by the flow of the refrigerant, and thus the first refrigerant flow hole is in an opened state, such that all the refrigerant passes through the variable baffle 700 to flow into the first header tank 100 along the tube 300 and then is discharged through the outlet 102 of the first header tank 100.

The basic operation of the outdoor heat exchanger 1 of FIG. is similar to that of FIG. 19. In the outdoor heat exchanger 1, the variable baffle 700 is installed in each of the first header tank 100 and the first header tank 200 two by two, and thus the outdoor heat exchanger 1 has the 5-pass refrigerant flow in the cooling mode and the 1-pass refrigerant flow in the heating mode.

In another exemplary embodiment, the outdoor heat exchanger of FIG. 21 includes the variable baffles 700 having different installation directions.

That is, in the first and third variable baffles 700 of the variable baffles 700 installed in the first header tank 100 and the variable baffle 700 installed in the first header tank 200, the second fixing means 720 is installed on the front surface in the refrigerant flow direction in the cooling mode to serve to switch the refrigerant flow direction and in the second variable baffle 700 of the variable baffles installed in the first header tank 100, the second fixing means 720 is disposed on the rear surface in the refrigerant flow direction in the cooling mode to make the refrigerant pass therethrough.

Therefore, in the outdoor heat exchanger 1 of FIG. 21, in the cooling mode, the refrigerant introduced through the inlet 101 formed at the upper portion of the first header tank 100 flows into the first header tank 200 along the tube 300 by the first variable baffle 700, again flows into the first header tank 100 by the variable baffle 700 installed in the first header tank 200, and then passes through the second variable baffle 700 to move downwardly. Next, the refrigerant flows into the first header tank 200 along the tube 300 and then is discharged through the outlet 102 of the first header tank 100 along the tube 300 again.

In the heating mode, in the outdoor heat exchanger 1 of FIG. 21, the positions of the inlet 101 and the outlet 102 are changed to each other, and thus the refrigerant flow direction is also reversed.

First, the refrigerant is introduced through the inlet 101 formed at the lower portion of the first header tank 100, and the refrigerant flow direction is changed by the second variable baffle 700 of the first header tank 100 and thus the refrigerant flows into the first header tank 200 along the tube 300 and then moves upwardly to be discharged through the outlet 102 of the first header tank 100 along the tube 300.

Therefore, the outdoor heat exchanger 1 of the present invention may be configured such that the flow of the refrigerant is reversed at the time of the switching of the cooling and heating modes in the vehicle heat pump system, and the number of refrigerant passes is reduced at the time of the heating than at the time of the cooling, thereby maximally retarding the frosting phenomenon due to the increase in the amount of pressure drop on the refrigerant side and improving the system efficiency.

DETAILED DESCRIPTION OF MAIN ELEMENTS

| | |
|---|---|
| 1: Outdoor heat exchanger | |
| 100: First header tank | |
| 110: Inlet tank | 120: Outlet tank |
| 101: Inlet | 102: Outlet |
| 130: Communication path | |
| 200: Second header tank | |
| 300: Tube | |
| 400: Fin | |
| 500: Receiver dryer | |
| 510: First connection part | 520: Second connection part |
| 530: Body | |
| 600: Switching baffle | |
| 700: Variable baffle | |
| 701: First variable baffle | 702: Second variable baffle |
| 710: First fixing means | 711: First refrigerant flow hole |
| 720: Second fixing means | 721: Seating protrusion |
| 722: Second refrigerant flow hole | |

| | |
|---|---|
| 730: Opening and closing means | 731: Space part |
| 740: Clad barrier wall | |

The invention claimed is:

1. An outdoor heat exchanger of a vehicle heat pump system, comprising:
a first header tank and a second header tank having a refrigerant introduced thereinto or discharged therefrom and disposed in parallel while being spaced apart from each other by a predetermined distance in a height direction or a longitudinal direction;
a plurality of tubes having both ends fixed to the first and second header tanks to form a refrigerant channel;
a plurality of fins interposed between the tubes; and
a variable baffle disposed in the first header tank or the second header tank and having opening and closing controlled according to switching of cooling and heating modes,
wherein the number of refrigerant flow passes in the cooling mode is equal to or larger than the number of refrigerant flow passes in the heating mode,
wherein a position of an inlet into which the refrigerant is introduced and a position of an outlet through which the refrigerant is discharged are the same even if the outdoor heat exchanger is switched to the cooling or heating mode.

2. The outdoor heat exchanger of claim 1, further comprising:
a switching baffle disposed in the first header tank or the second header tank to control a flow of the refrigerant; and
a receiver dryer connected to the second header tank through a first connection part and a second connection part.

3. The outdoor heat exchanger of claim 2, wherein the variable baffle includes:
a first variable baffle disposed in the first header tank or the second header tank and opened and closed to induce or block the flow of the refrigerant; and
a second variable baffle disposed in the first connection part or the second connection part to be opened and closed.

4. The outdoor heat exchanger of claim 3, wherein the first variable baffle and the second variable baffle have opening and closing controlled according to a change in refrigerant temperature according to the switching of the cooling or heating mode.

5. The outdoor heat exchanger of claim 4, wherein the first variable baffle and the second variable baffle are made of a material whose shape or position is changed according to the change in temperature.

6. The outdoor heat exchanger of claim 3, wherein the outdoor heat exchanger 1 is a down flow type heat exchanger in which the first header tank and the second header tank are disposed in parallel while being spaced apart from each other by a predetermined distance in the height direction.

7. The outdoor heat exchanger of claim 6, wherein the first header tank includes:
an inlet tank extending in the longitudinal direction to be introduced with the refrigerant; and
an outlet tank disposed on the inlet tank in parallel with the inlet tank in the height direction to discharge the refrigerant.

8. The outdoor heat exchanger of claim 7, wherein two switching baffles are disposed within the inlet tank of the first header tank at a predetermined interval, and
one switching baffle is disposed at a front end of the second header tank in a refrigerant flow direction and the first variable baffle is disposed at a rear end, such that the outdoor heat exchanger has a 4-pass channel in the cooling and heating modes.

9. The outdoor heat exchanger of claim 8, wherein in the cooling mode, the first variable baffle is closed and the second variable baffle is opened and thus a 3-pass refrigerant reaches a 4 pass via the receiver dryer, and
in the heating mode, the first variable baffle is opened and the second variable baffle is closed and thus the 3-pass refrigerant directly reaches the 4 pass.

10. The outdoor heat exchanger of claim 7, wherein a first variable baffle is disposed at a front end in a refrigerant flow direction within the inlet tank of the first header tank and a switching baffle is disposed at a rear end while being spaced apart therefrom by a predetermined interval, and
the two first variable baffles are disposed within the second header tank at a predetermined interval, such that the outdoor heat exchanger 1 has a 4-pass channel in the cooling mode and a 2-pass channel in the heating mode.

11. The outdoor heat exchanger of claim 10, wherein in the cooling mode, the first variable baffle is closed and the second variable baffle is opened and thus a 3-pass refrigerant reaches a 4 pass via the receiver dryer, and
in the heating mode, the first variable baffle is opened and the second variable baffle is closed and thus the 1-pass refrigerant directly reaches the 2 pass.

12. The outdoor heat exchanger of claim 1, wherein at the time of the switching of the cooling and heating modes in the vehicle heat pump system, a position of an inlet into which the refrigerant is introduced and a position of an outlet through which the refrigerant is discharged are changed to each other and a flow of the refrigerant is reversed.

13. The outdoor heat exchanger of claim 1, wherein the variable baffle is opened in the cooling mode.

14. The outdoor heat exchanger of claim 13, wherein the variable baffle is disposed in each of the first header tank and the second header tank one by one to have a 3-pass refrigerant flow in the cooling mode and a 1-pass refrigerant flow in the heating mode.

15. The outdoor heat exchanger of claim 13, wherein the variable baffle is disposed in each of the first header tank and the second header tank two by two to have a 5-pass refrigerant flow in the cooling mode and a 1-pass refrigerant flow in the heating mode.

16. The outdoor heat exchanger of claim 13, wherein the variable baffle includes:
a first fixing means coupled with the first header tank or the second header tank and including a first refrigerant flow hole formed by hollowing a certain region thereof;
a second fixing means coupled and fixed to a plurality of seating protrusions by contacting the plurality of seating protrusions that protrude from an edge of one side of the first fixing means while being spaced apart from each other by a predetermined interval in a circumferential direction and including a second refrigerant flow hole through which the refrigerant flows;
an opening and closing means disposed in a space part between the first fixing means and the second fixing means formed by the seating protrusion and linearly moving within the space part in a refrigerant flow direction; and a clad barrier wall formed in a certain region of an outer side of the refrigerant flow hole while protruding from the other side of the first fixing means.

17. The outdoor heat exchanger of claim 16, wherein in the variable baffle, one side of the first fixing means is further provided with the clad barrier wall and the clad barrier wall is formed to be positioned at an outer side of the opening and closing means.

18. The outdoor heat exchanger of claim 16, wherein the clad barrier wall protrudes in a region of the outer side of the first refrigerant flow hole located at one side or both sides in a width direction of the outdoor heat exchanger.

19. The outdoor heat exchanger of claim 16, wherein the clad barrier wall protrudes over the whole region of the outer side of the first refrigerant flow hole.

20. The outdoor heat exchanger of claim 16, wherein the clad barrier wall protrudes at a predetermined interval over the whole region of the outer side of the first refrigerant flow hole.

21. The outdoor heat exchanger of claim 16, wherein the second refrigerant flow hole is formed in a certain region of the second fixing means while being hollow and formed in at least one.

22. The outdoor heat exchanger of claim 16, wherein the second refrigerant flow hole is formed by digging a certain region of an outer circumferential surface of the second fixing means inwardly and formed in at least one.

23. The outdoor heat exchanger of claim 16, wherein the variable baffle is coupled with the first header tank or the first header tank so that the second fixing means of the variable baffle is disposed on a front surface in a refrigerant flow direction in the cooling mode.

* * * * *